(12) United States Patent
Dumas

(10) Patent No.: US 6,685,251 B2
(45) Date of Patent: Feb. 3, 2004

(54) RETRACTABLE COVER SYSTEM FOR OPEN TOP END CONTAINERS

(76) Inventor: Maurice Dumas, 1488, Route Kennedy Sud, St-Côme, Beauce, Québec (CA), G0M 1J0

( * ) Notice: Subject to any disclaimer, the term of this patent is extended or adjusted under 35 U.S.C. 154(b) by 0 days.

(21) Appl. No.: 10/096,897

(22) Filed: Mar. 14, 2002

(65) Prior Publication Data

US 2003/0173795 A1 Sep. 18, 2003

(51) Int. Cl.[7] .................................................. B60P 7/04
(52) U.S. Cl. ........................ 296/100.01; 296/100.13; 296/98; 160/273.1; 160/265
(58) Field of Search ................ 276/98, 100.01, 276/100.11, 100.13, 100.17, 100.18; 160/271, 273.1, 265, 307, 291, 310

(56) References Cited

U.S. PATENT DOCUMENTS

| | | | |
|---|---|---|---|
| 3,488,087 A | * | 1/1970 | Cox |
| 3,667,802 A | * | 6/1972 | Love |
| 3,759,568 A | * | 9/1973 | Unruh |
| 3,768,540 A | * | 10/1973 | McSwain |
| 3,819,082 A | * | 6/1974 | Rosenvold |
| 4,138,154 A | * | 2/1979 | McKeon .................... 296/98 |
| 4,717,196 A | * | 1/1988 | Adams ....................... 296/98 |
| 4,784,427 A | * | 11/1988 | Burgess ...................... 296/98 |
| 4,792,178 A | * | 12/1988 | Kokx .......................... 296/98 |
| 4,909,563 A | * | 3/1990 | Smith ......................... 296/98 |
| 5,205,605 A | * | 4/1993 | Haddad, Jr. ................. 296/98 |
| 5,579,820 A | * | 12/1996 | LePage et al. ............. 160/271 |

FOREIGN PATENT DOCUMENTS

GB         2074511      * 11/1981

* cited by examiner

Primary Examiner—Joseph D. Pape
Assistant Examiner—H. Gutman
(74) Attorney, Agent, or Firm—Ogilvy Renault; Guy J. Houle

(57) ABSTRACT

A retractable cover system for open top end containers, such as tractor trailers, is described. A tarp is wound on a drum and stored in a forward top end of the container. Opposed side seam portions of the tarp are secured to nylon pull cables and extend in guide channels secured adjacent top edges of opposed side walls of the container. The cables are secured together at a predetermined location and wound on a pulley whereby to pull the tarp from the drum in unison across the open top end. The drum is also secured to a pulley which is driven by a drive train assembly which also drives the cable pulley. The drive train assembly has a driven shaft and an idle shaft disposed in parallel and interconnected by a pair of sprockets which are secured on clutches.

12 Claims, 6 Drawing Sheets

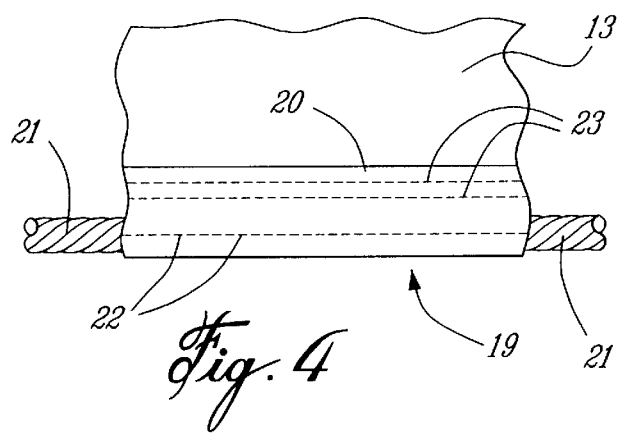
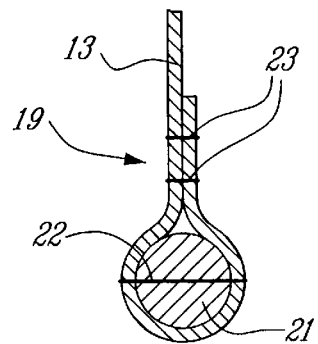
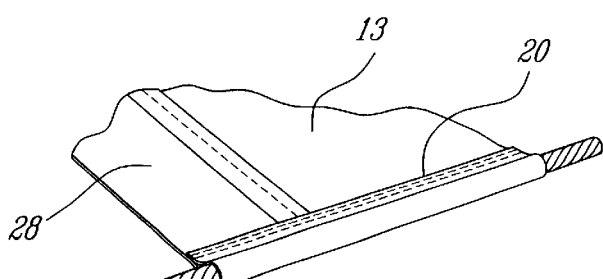
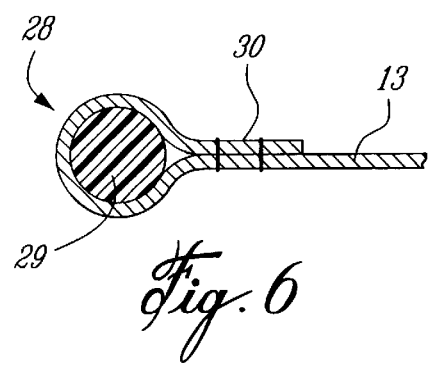
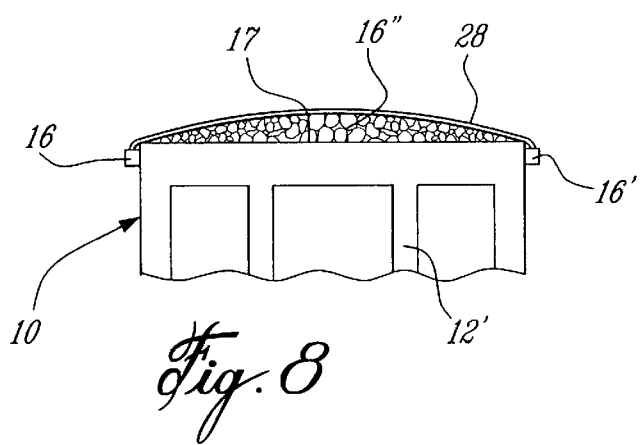

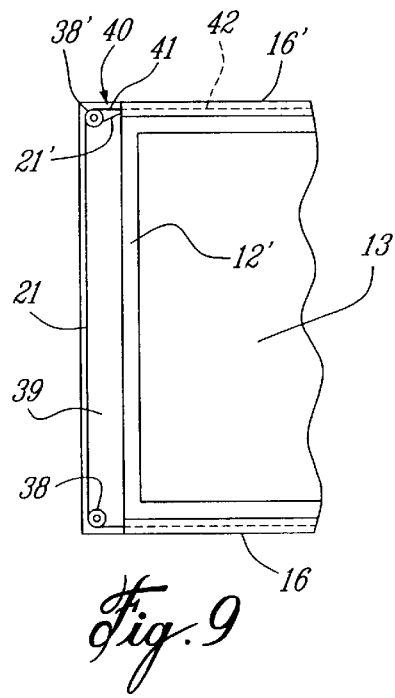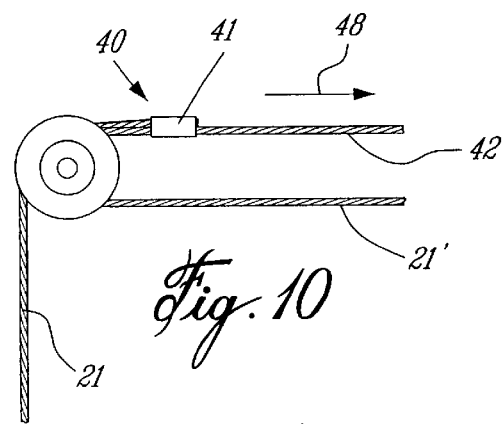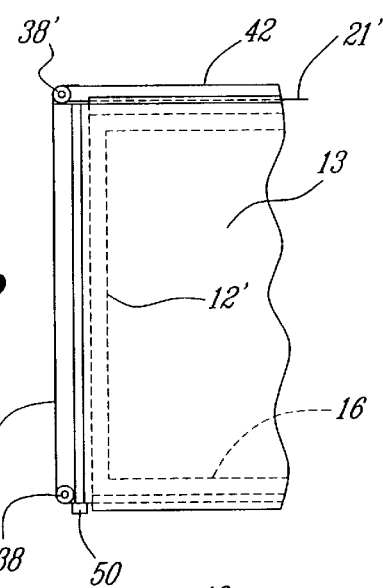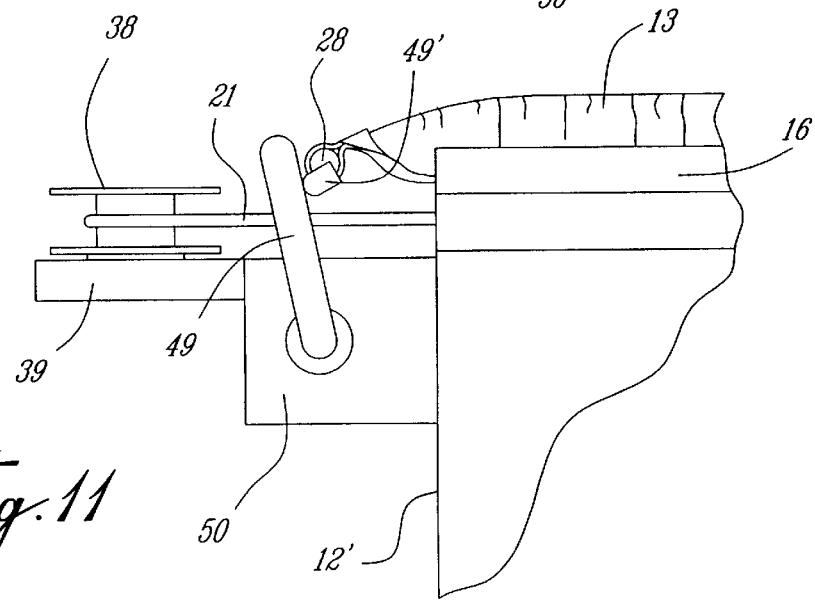

RETRACTABLE COVER SYSTEM FOR OPEN TOP END CONTAINERS

FIELD OF THE INVENTION

The present invention relates to a retractable cover system for an open top end container and wherein the system is operated by a drive train having a reversible electric motor drive whereby to pull the tarp over the container or retract it therefrom.

BACKGROUND OF THE INVENTION

Retractable cover systems for open top end containers such as tractor trailers have been known for many years. It is also known to operate a cover such as a tarp to cover the open top end of these containers by motor drives and an example of these is illustrated in U.S. Pat. No. 3,829,154. Mechanical means for deploying the tarp and rewinding it on a drum is also taught by U.S. Pat. Nos. 3,977,719 and 4,995,663. These are only examples of existing systems but there are common problems in all of these retractable cover systems and namely that many of these do not adequately seal the open top end container against inclement weather conditions, the tarp often jams during deployment or retraction causing damage to the retractable cover system and adding cost to the operation. Furthermore, most manual systems are difficult to access and operate due to the large size of these tarps and they are also time-consuming. Another disadvantage is that the retractable cover system and particularly the guide members or associated hardware secured about the trailer becomes damaged by loading vehicles during loading and unloading of material within the open end container.

There is therefore the need to provide a retractable cover system which is fully automatic and reliable and which adequately shields the material within the open top end container from inclement weather.

SUMMARY OF THE INVENTION

It is therefore a feature of the present invention to provide a retractable cover system for open top end containers and which substantially overcomes the above-mentioned disadvantages of the prior art and fulfill the required need.

According to a broad aspect of the present invention there is provided a retractable cover system for open top end containers. The system comprises an elongated rectangular roll-up tarp wound on a drum. The drum is secured adjacent a top end of an end wall of a container. Guide channels are securable adjacent top edges of opposed side walls of a container for guidingly receiving therein a side seam portion provided on opposed longitudinal edges of the tarp. Each side seam portion has a pull cable immovably connected to a respective one of the longitudinal edges of the tarp. The pull cables extend beyond a free end edge of the tarp and are each guidingly displaceable by a respective guide member secured adjacent a rear corner of an opposed end wall of the container. The cables interconnect together at a predetermined connecting point spaced from the free end edge a distance greater than the length of the container. Pulling means is secured to the connecting point and wound on a drivable cable spool. The drum is mounted on a drive shaft. A drive train assembly is coupled to a reversible electric motor drive. The drive train assembly has a driven shaft rotatable by the electric motor in a clockwise or counter-clockwise direction. An idle shaft is disposed parallel and spaced from the driven shaft. A pair of sprockets is secured to each the driven shaft and the idle shaft and aligned with one another and interconnected by a pair of endless sprocket chains. The sprockets on the driven shaft and idle shaft are secured to respective clutch assemblies. Each clutch assembly of the driven shaft is coupled to a respective linkage connected to a respective one of the drive shaft of the drum and the drivable cable spool whereby to drive one of said drum or said cable spool while idling the other and dependent on the drive direction of the electric motor whereby to pull the tarp over the open top end of the container or retract it therefrom.

BRIEF DESCRIPTION OF THE DRAWINGS

A preferred embodiment of the present invention will now be described with reference to the example thereof as illustrated by the accompanying drawings in which

FIG. 4 is a fragmented top view showing the construction of the side seam portion and pull cable;

FIG. 5 is a section view of the side seam portion and its attachment to the pull cable;

FIG. 6 is a section view showing the construction of the outer end edge of the tarp;

FIG. 7 is a perspective view showing an outer end corner section of the tarp with the pull cable extending therefrom;

FIG. 8 is a simplified cross-section view, partly fragmented, of a container loaded with a product and with the tarp pulled thereover;

FIG. 9 is a simplified top view showing the pull cables interconnected together and the position of the connecting point when the tarp is wound on the spool;

FIG. 10 is an enlarged view showing the interconnection of the cables together and attached to a pulling cable which is wound about a cable spool;

FIG. 11 is a fragmented side end view showing how the pull cable is guided about a guide wheel adjacent a rear top end edge of the container and the position of a switch which is actuated by a member connected to the tarp or pull cable whereby to stop the motor when the tarp is fully drawn over the open top end of a container;

FIG. 12 is a fragmented top end view illustrating the tarp fully drawn over the container;

DESCRIPTION OF PREFERRED EMBODIMENTS

Figure 1:
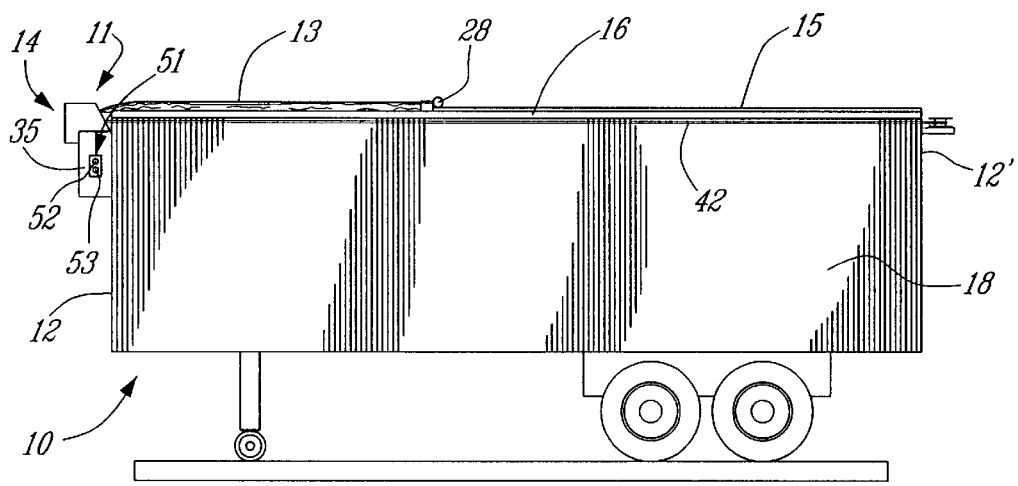
FIG. 1 is a simplified side view illustrating a transportable open top end container, herein a tractor trailer on which is installed the retractable cover system of the present invention.
Figure 2:
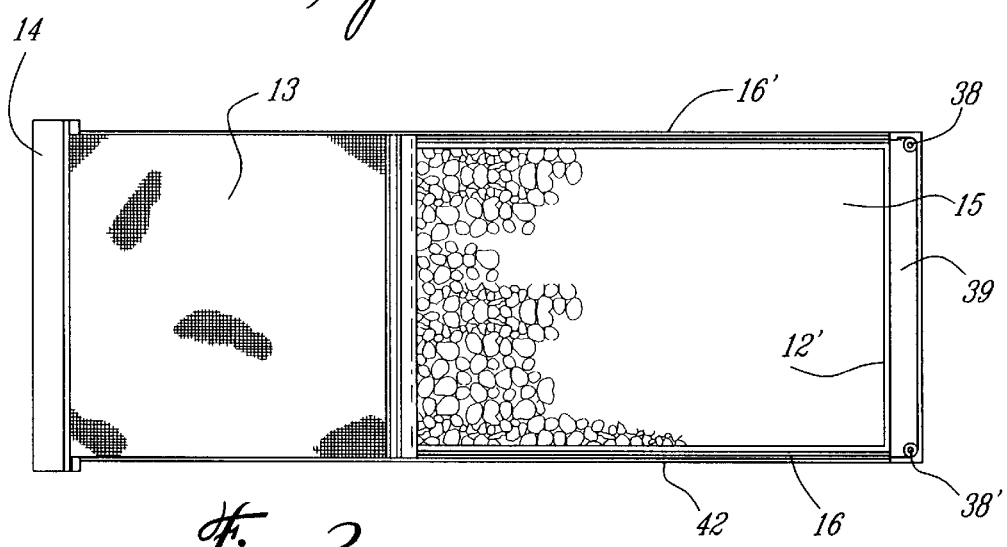
FIG. 2 is top view of FIG. 1.
Figure 3:
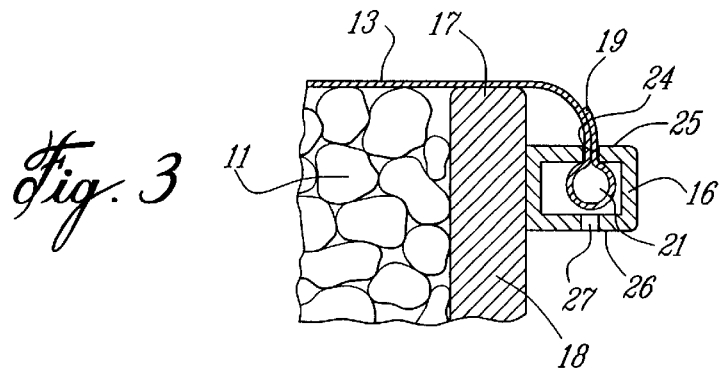
FIG. 3 is a fragmented side view showing the construction and disposition of the guide channels and the side seam portion of the tarp guidingly contained therein.

Referring to the drawings and more particularly to FIGS. 1 to 3 there is shown a tractor trailer container 10 which is provided with the retractable cover system 11 of the present invention. The retractable cover system 11 is preferably secured to the front wall 12 of the container in a top portion thereof. As hereinshown a tarp 13 which is housed in a tarp housing 14 is deployable over the open top end 15 of the container 10 whereby to cover material, such as wood chips 16" etc. as shown in FIG. 3 during transport whereby to shield this material against inclement weather and wind.

The container 10 is provided with guide channels 16 which are secured adjacent top edges 17 of the opposed sidewalls 18 of the container 10. These channels are provided for guidingly receiving therein a side seam portion 19 provided on opposed longitudinal edges of the tarp 13.

As shown in FIGS. 4 and 5 the side seam portions 19 are formed by an edge portion 20 of the tarp 13 being folded over a pull cable 21 and secured thereto by a stitched seam 22 extending through the folded tarp and the cable 21 as better illustrated in FIG. 5. The overlap edge portion 23 strengthens the side seam portion adjacent the pull cable. The pull cable constitutes pulling means and is preferably a nylon flexible cable.

As can be seen from FIG. 3 the guide channels 16 are secured to the sidewall 18 of the container below the top edge 17 whereby to protect the guide channels when the containers are loaded by loading buckets of land vehicles operating adjacent the container as the bucket frame or linkage often touches the top edge 17 of the container during unloading. The guide channels 16 are provided with a longitudinal slot 24 in its top wall 25 to guide the overlap edge portion 23 of the tarp therealong when pulled therein by the pull cables 21. The bottom wall 26 of the channels is also provided with holes 27 to evacuate water that may seep therein.

As shown in FIGS. 6 and 7 the free front edge 28 of the tarp is also provided as an enlarged flexible edge portion and this is constituted by retaining a flexible foam rod 29 in a folded front seam 30 of the tarp. This front edge 28 facilitates the drawing of the tarp over the material placed in the container and the spreading out of the material when the material exceeds the top edge 17 of the container as illustrated in FIG. 8. The foam rod also adds rigidity to the front edge of the tarp to maintain it substantially transverse to the opposed channels when the tarp is being drawn over the product which is placed in the container.

Figure 13:
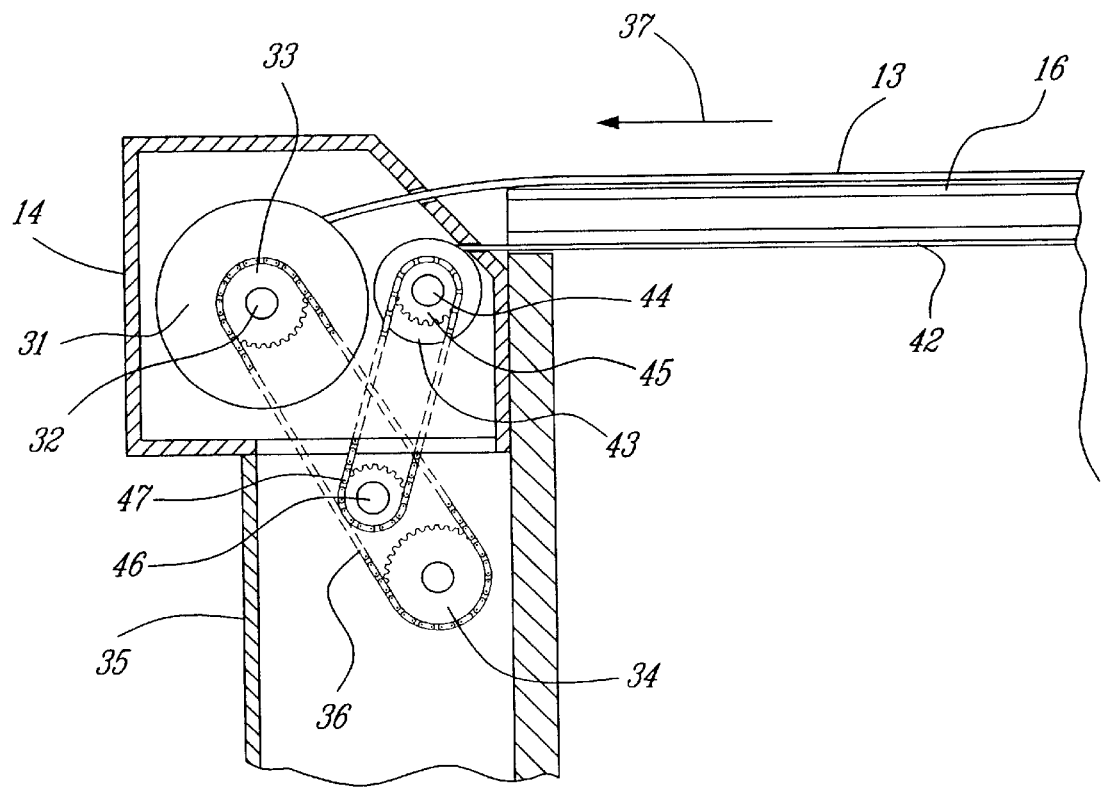
FIG. 13 is a simplified side view showing the drive sprocket attachment for the drum and the cable spool.

As shown in FIG. 13 the tarp 13 is wound on a drum 31 which is secured to a shaft 32. A drive pulley 33 is secured to the shaft 32 and connected to a driven pulley 34 which forms part of the drive train, which will be described later, and which is secured in the drive train housing 35 below the tarp housing 14. A link chain 36 interconnects the driven pulley 34 to the drive pulley 33 whereby to retract the tarp 13 into the tarp housing 14 in the direction of arrow 37.

As shown in FIGS. 9 and 10 the pull cables 21 and 21' located respectively in one of the guide channels 16 and 16' are guidingly displaced in these guide channels and extend therethrough when the tarp is fully wound about the drum 31. The length of these pull cables 21 and 21' is such that when the tarp is fully wound on the drum they extend about guide members, herein guide wheels 38 and 38' which are secured adjacent rear corners of a top end bracket 39 (see FIG. 11) and are guided about a portion of the guide wheels. As hereinshown pull cable 21 extends about guide wheel 38 and guide wheel 38' whereby to interconnect with cable 21' at a connecting point 40. The interconnection is made by a clamp 41 which prevents any slippage of the connected cables. One of the cables 21 or 21' then continues along a side of the container and constitutes a pull cable 42 which extends to a drivable cable spool 43 (as shown in FIG. 13).

The drivable cable spool is secured on a support shaft 44. A drivable sprocket 45 is secured to the shaft 44 of the cable spool 43 and connected to a spool driven pulley 46 by a chain link 47 whereby to rotate the drivable cable spool 43 to wind the pulling cable 42 thereon and consequently pull both pull cables 21 and 21'. It is pointed out that the length of the pull cables 21 and 21' is greater than the length of the container due to the manner in which they are connected together, as illustrated in FIGS. 9 and 10. When the pull cable 42 is wound on the cable spool 43 the cable is pulled in the direction of arrow 48, as shown in FIG. 10, and as can be seen both cables 21 and 21' are drawn in unison. Accordingly, the tarp is drawn substantially perfectly transverse across the open top end 15 of the container 10.

Figure 14:
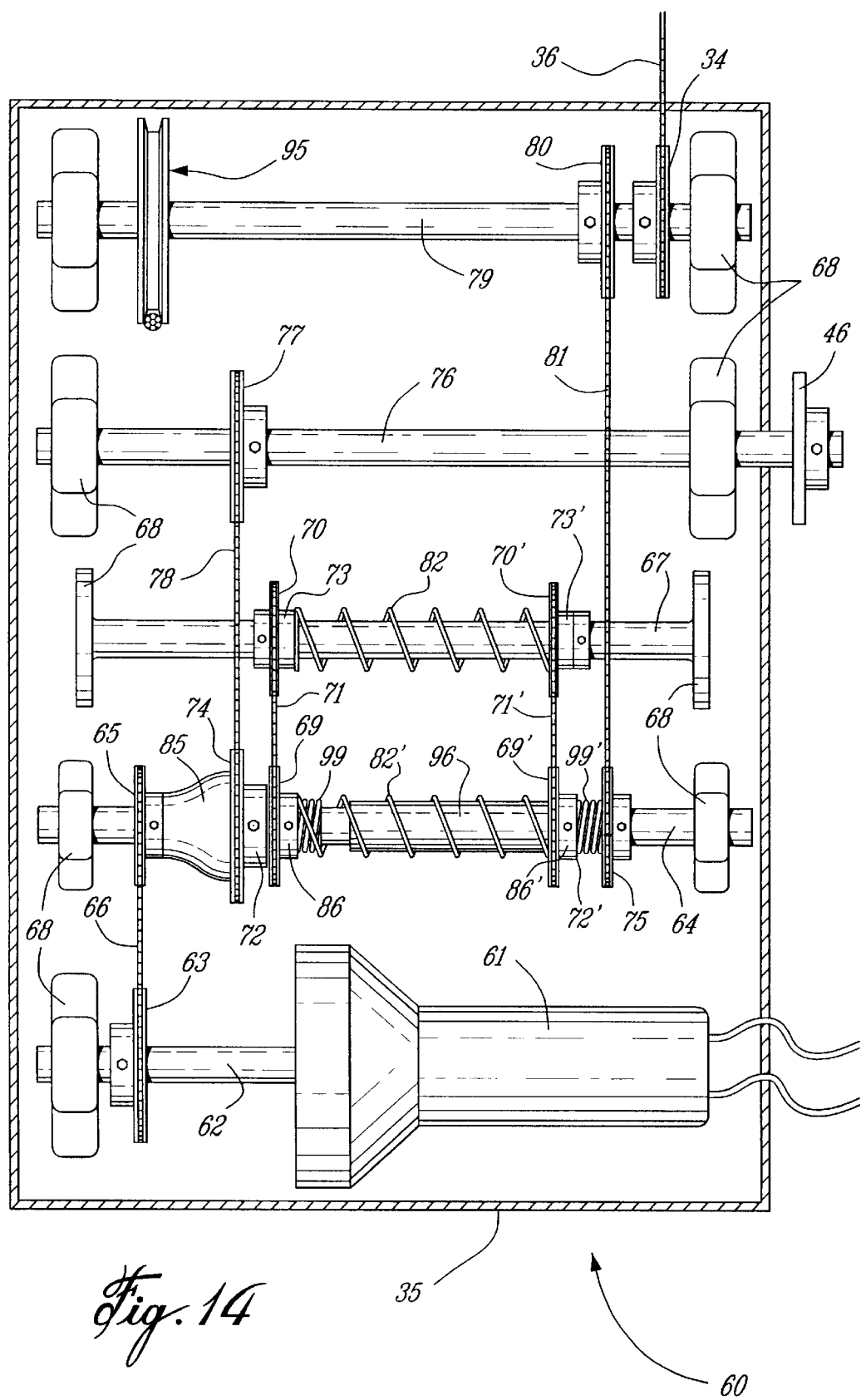
FIG. 14 is a plan view showing the construction of the drive train assembly powered by a reversible d.c. motor.

As shown in FIGS. 11 and 12 when the tarp 13 is fully drawn over the rear wall 12' of the container it extends beyond this rear wall a limited distance whereby to fully cover the open top end. As the tarp is drawn past the rear wall 12' it actuates a switch arm 49 of a position detector switch 50 whereby to shut-off an electric motor drive, which will be described later, to immobilize the drive train assembly 60 as illustrated in FIG. 14 and which is housed in the drive train housing 35 below the tarp housing 14 making it readily accessible to an operator. A trip member 49' may be secured at a predetermined location at the free end edge 28 of the tarp for actuating the switch arm 49. A control switch 51 is mounted on the drive train housing 35 at an accessible location for the operator whereby by depressing a first push button or switch 52 the tarp is deployed over the container and by depressing a second switch 53 the tarp is retracted from the open top end of a container. This switch could also be located elsewhere.

With reference now to FIG. 14 there will be described the construction and operation of the drive train assembly. As hereinshown the drive train assembly is coupled to a reversible drive electric motor 61 which is operated by the switches 52 and 53 whereby to drive the motor in a clockwise or counterclockwise direction. The output shaft 62 of the motor 61 has a sprocket drive wheel 63 which is connected to a driven shaft 64 by a driven sprocket 65 secured to the shaft and an endless chain link 66. Accordingly, the driven shaft 64 is rotated in a clockwise or counterclockwise direction depending on the direction of the drive imparted to the reversible electric motor 61.

An idle shaft 67 is supported parallel and spaced from the driven shaft 64 on the support frame 68. A pair of sprockets 69 and 69' are secured to the driven shaft 64 in a manner which will be described later. A further pair of sprockets 70 and 70' is also secured to the idle shaft, in a manner which will be described later. The sprockets 69 and 70 are interconnected together by an endless chain 71 while the sprockets 69' and 70' are interconnected together by the endless chain 71'. The sprockets 69 and 70 and 69' and 70' are disposed in alignment with one another. The sprockets 69, 69', 70 and 70' are secured to their respective shafts by respective clutch assemblies 72 and 72', 73 and 73' respectively. Drivable sprockets 74 and 75 are engageable by a respective one of the clutch assemblies 72 and 72'. The drivable sprocket 74 is secured to a cable spool drive shaft 76 through the sprocket 77 and endless chain 78 whereby to rotate the drive shaft 76 in a predetermined direction whereby to wind the cable 42 thereon. As can be seen the drive shaft 76 is connected to the spool driven pulley 46 which in turn connects to the drivable cable spool 43 as previously described with reference to FIG. 13. When the drivable sprocket 74 is not engaged it remains idle and free to rotate about the drive shaft 64 so as to permit the cable 42 to be pulled off the drivable cable spool 43 when the tarp is retracted on its drum 31.

The other driveable sprocket 75 is interconnected to the driven pulley 34 of the drum through an interim drive shaft 79 and a pulley 80 which is connected to drivable sprocket 75 by an endless chain 81. When the clutch assembly 72' is engaged the interim drive shaft 79 will be caused to rotate whereby to rotate the drum 31 and retract the tarp thereon. While the drum is rotated the cable spool is idle, as previously described, due to the fact that its clutch assembly 72 is disengaged.

The clutch assemblies 73 and 73' of the idle shaft each comprises directional bearing clutches wherein one of these clutches is engaged when the driven shaft is rotated clockwise and the other is engaged when the driven shaft is rotated counterclockwise. When one of the clutch assemblies 73 or 73' is engaged the other is disengaged and idle and therefore free to rotate about the idle shaft. Biasing means in the form of a helical spring 82 and 82' imparts a biasing force against these clutches to permit their engagement. The construction of such directional bearing clutches are well known in the art.

Figure 15:
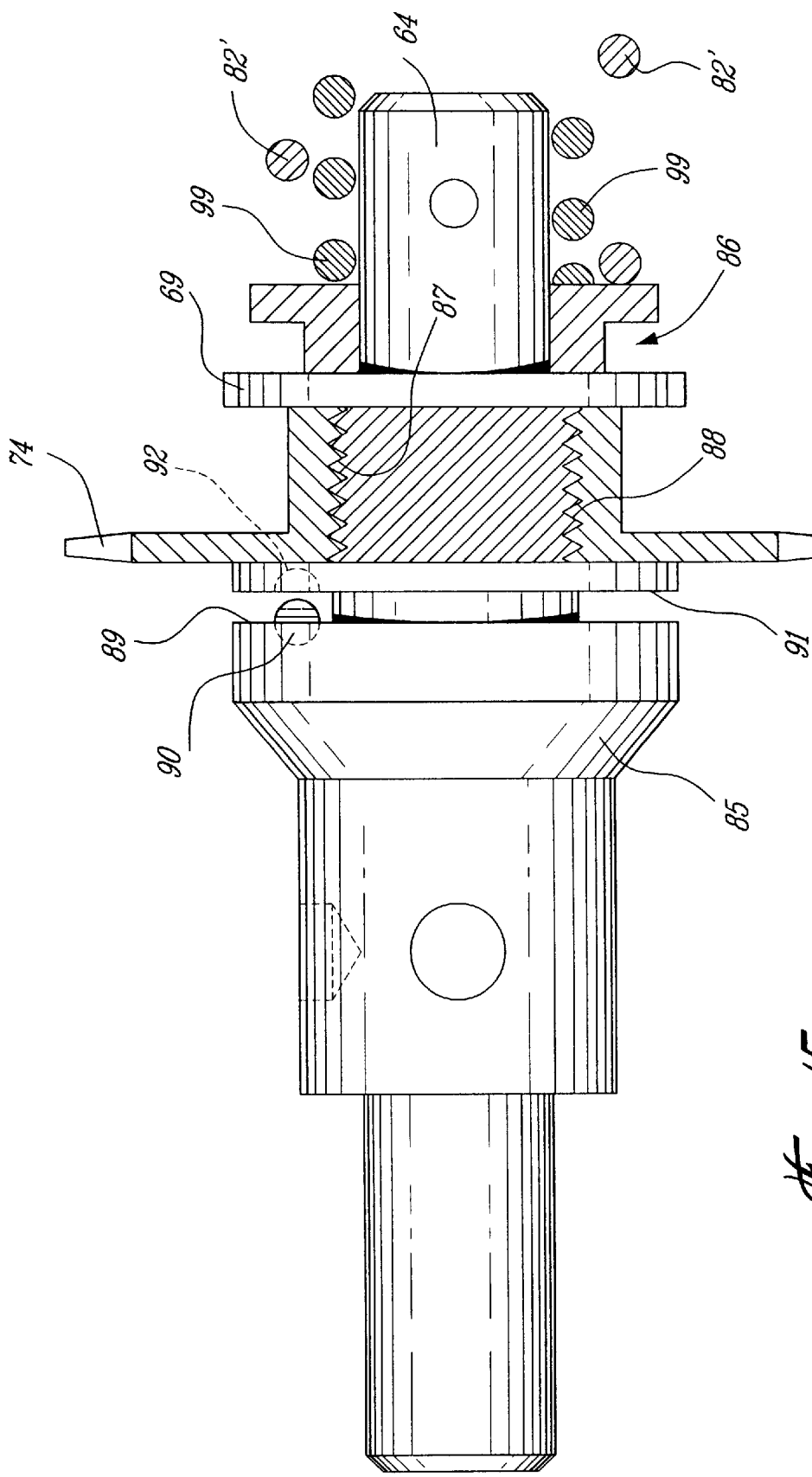
FIG. 15 is a side view showing the construction of the clutch assembly secured to the driven shaft.

The construction of the clutch assemblies 72 and 72' is illustrated in FIG. 15. As hereinshown the clutch assembly 72 comprises an engageable sprocket hub 85 and an actuating hub 86. The actuating hub 86 has a threaded bore 87 for threaded engagement with a threaded portion 88 of the driven shaft 64 adjacent the sprocket hub 85 whereby to connect the driven shaft 64 to the engageable sprocket hub 85 when the driven shaft is rotated by the motor 61 in either the clockwise or counterclockwise direction. These threaded bores 87 and 88 only engage in a specific rotational direction and the thread on one side of the shaft is opposed to the thread on the other side of the shaft. Accordingly, when the motor is driven in one direction only one of the drivable sprockets 74 or 75 is engaged and the other remains idle.

The engageable sprocket hub 85 has an engageable face 89 provided with locking means in the form of lock ball bearings 90, only one being shown herein but two or more may be provided in this face. These bearings are force-fitted into the face 89. The actuating hub 86 also has an engageable face 91 provided with cavities 92 to receive therein the lock bearing 90 and therefore permit the interlocking of the actuating hub with the engageable sprocket hub and causing the hub 85 and its sprocket 74 to rotate. The engageable sprocket hub and actuating hub on the other side of the driven shaft 64 are identical except that the interconnecting threaded bores 87 and 88 are engageable in the opposite rotational direction of the shaft.

As shown in FIG. 14 the interim drive shaft 79 providing the drive to the drum 31 over which is wound the tarp 13 is equipped with a friction brake assembly 95 which is of a conventional design and will not be described in detail herein, whereby to prevent the drum from spinning out of control as the tarp is drawn therefrom. The brake assembly provides tension on the drum so that the tarp can be pulled at a constant speed. On the other hand, when winding the tarp on the drum it is necessary that the speed of the interim drive shaft 79 be variable as the diameter of the tarp wound on the drum increases. This is provided by a variable speed shaft 96 which is secured over the driven shaft 64 and operable in a manner well known in the art and not described in detail herein. The main spring 82 applying biasing force against the clutch assemblies is disposed over this variable speed shaft 96. As shown in FIG. 14 further biasing means in the form of springs 99 and 99' are provided to provide the biasing pressure against the actuating hubs 86 and 86'.

It is within the ambit of the present invention to cover any obvious modifications of the preferred embodiment described herein provided such modification falls within the scope of the appended claims.

What is claimed is:

1. A retractable cover system for an open top end container, said system comprising an elongated rectangular roll-up tarp wound on a drum, said drum being secured adjacent a top end of an end wall of said container, guide channels secured adjacent top edges of opposed side walls of said container for guidingly receiving therein a side seam portion provided on opposed longitudinal edges of said tarp, each said side seam portion being constituted by a pull cable immovably connected to a respective one of said longitudinal edges of said tarp, said pull cables extending beyond a free end edge of said tarp and each guidingly displaceable by a respective guide member secured adjacent a rear corner of an opposed end wall of said container, said cables interconnecting together at a predetermined connecting point spaced from said free end edge a distance greater than the length of said container, pulling means secured to said connecting point and wound on a drivable cable spool, said drum being mounted on a drive shaft, and a drive train assembly coupled to a reversible electric motor drive, said drive train assembly having a driven shaft rotatable by said electric motor in a clockwise or counterclockwise direction, an idle shaft disposed parallel and spaced from said driven shaft, a pair of sprockets secured to each of said driven shaft and said idle shaft and aligned with one another and interconnected by a pair of endless sprocket chains, said sprockets on said driven shaft and idle shaft being secured to a respective clutch assembly, there being further provided drivable sprockets engageable by said clutch assembly of said driven shaft and connectable to a respective one of said drive shaft of said drum and said drivable cable spool whereby to drive one of said drum or said cable spool while idling the other and dependent on the drive direction of said electric motor whereby to pull said tarp over said top end of said container or to retract said tarp therefrom.

2. A retractable cover system as claimed in claim 1 wherein said clutch assembly of said driven shaft each comprises an engageable sprocket hub and an actuating hub, said actuating hub having a threaded bore for threaded engagement with a threaded portion of said driven shaft adjacent said sprocket hub to connect said driven shaft to said engageable sprocket hub when said driven shaft is rotated by said motor in one of said clockwise or counterclockwise direction, and biasing means to apply a biasing pressure against said actuating hub in the direction of said engageable sprocket hub.

3. A retractable cover system as claimed in claim 2 wherein said engageable sprocket hub is provided with an engageable face provided with locking means, said actuating hub also having an engageable face for interlocking with said locking means when urged thereagainst by said displacement of said actuating hub against said engageable sprocket hub due to said threaded engagement with said threaded portion of said driven shaft when said driven shaft is rotated in a predetermined one of said clockwise or counterclockwise direction.

4. A retractable cover system as claimed in claim 3 wherein said locking means is constituted by one or more lock ball bearings immovably secured in said engageable face of said engageable sprocket hub and projecting therefrom.

5. A retractable cover system as claimed in claim 2 wherein said clutch assembly of said idle shaft each comprises directional bearing clutches, one of said directional bearing clutches being engaged when said driven shaft is rotated clockwise and the other being engaged when said driven shaft is rotated in a counterclockwise direction, when the one of said clutches is engaged the other is disengaged and idle and therefore free to rotate about said idle shaft.

6. A retractable cover system as claimed in claim 1 wherein said pulling means is an actuating cable portion secured to said drivable cable spool and said connecting point.

7. A retractable cover system as claimed in claim 6 wherein said guide member is a guide wheel secured adjacent said rear corners of a top end bracket secured rearwardly adjacent a rear top edge of said opposed end wall of said container, each of said pull cables being guided about a portion of said guide wheels, one of said pull cables extending from said end edge of said tarp and guided by both said guide wheels to connect at said connecting point when said tarp is retracted on said drum, said actuating cable portion being wound on said drivable cable spool to draw both said pull cables to draw said tarp from said side seam portions in unison.

8. A retractable cover system as claimed in claim 7 wherein said tarp has an enlarged flexible forward edge portion having a flexible rod-like member secured thereto.

9. A retractable cover system as claimed in claim 7 wherein said end bracket is provided with a reset switch connected to said electric motor, said reset switch having an actuating arm, and a trip member secured at said free end edge of said tarp adjacent one of said pull cables to displace said actuating arm to place said electric motor in a stand-by non-operational state.

10. A retractable cover system as claimed in claim 1 wherein said guide channels are constituted by hollow guide channels secured to a respective one of said opposed side walls of said container exteriorly thereof and recessed below one of said opposed top edges of said opposed side walls, said side seam portions of said tarp being captive in a respective one of said channels and with an adjacent side portion extending through a slot formed in a top wall of said guide channels.

11. A retractable cover system as claimed in claim 2 wherein said driven shaft is connectable to a variable speed shaft when rotated in one of said clockwise or counterclockwise direction.

12. A retractable cover system as claimed in claim 1 wherein said container is a tractor trailer container.

* * * * *